Aug. 27, 1963

V. E. ACKLES 3,102,052

TUMBLING MACHINE

Filed March 10, 1961

INVENTOR
Virgil E. Ackles
By
R. S. Berry
ATTORNEY

INVENTOR
Virgil E. Ackles

Aug. 27, 1963 V. E. ACKLES 3,102,052
TUMBLING MACHINE
Filed March 10, 1961 5 Sheets-Sheet 3
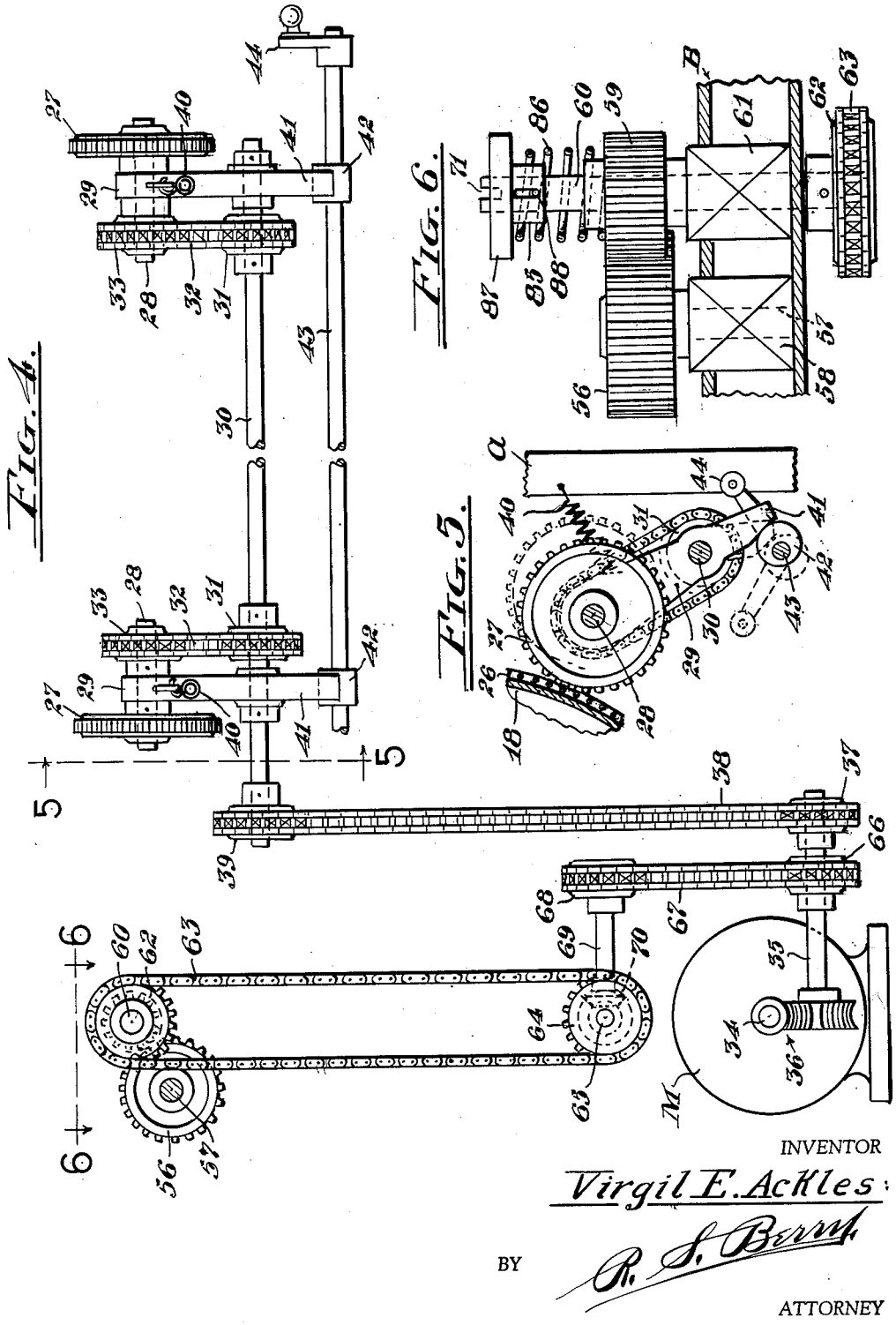
INVENTOR
Virgil E. Ackles
BY
ATTORNEY Aug. 27, 1963
V. E. ACKLES
3,102,052
TUMBLING MACHINE
Filed March 10, 1961
5 Sheets-Sheet 4
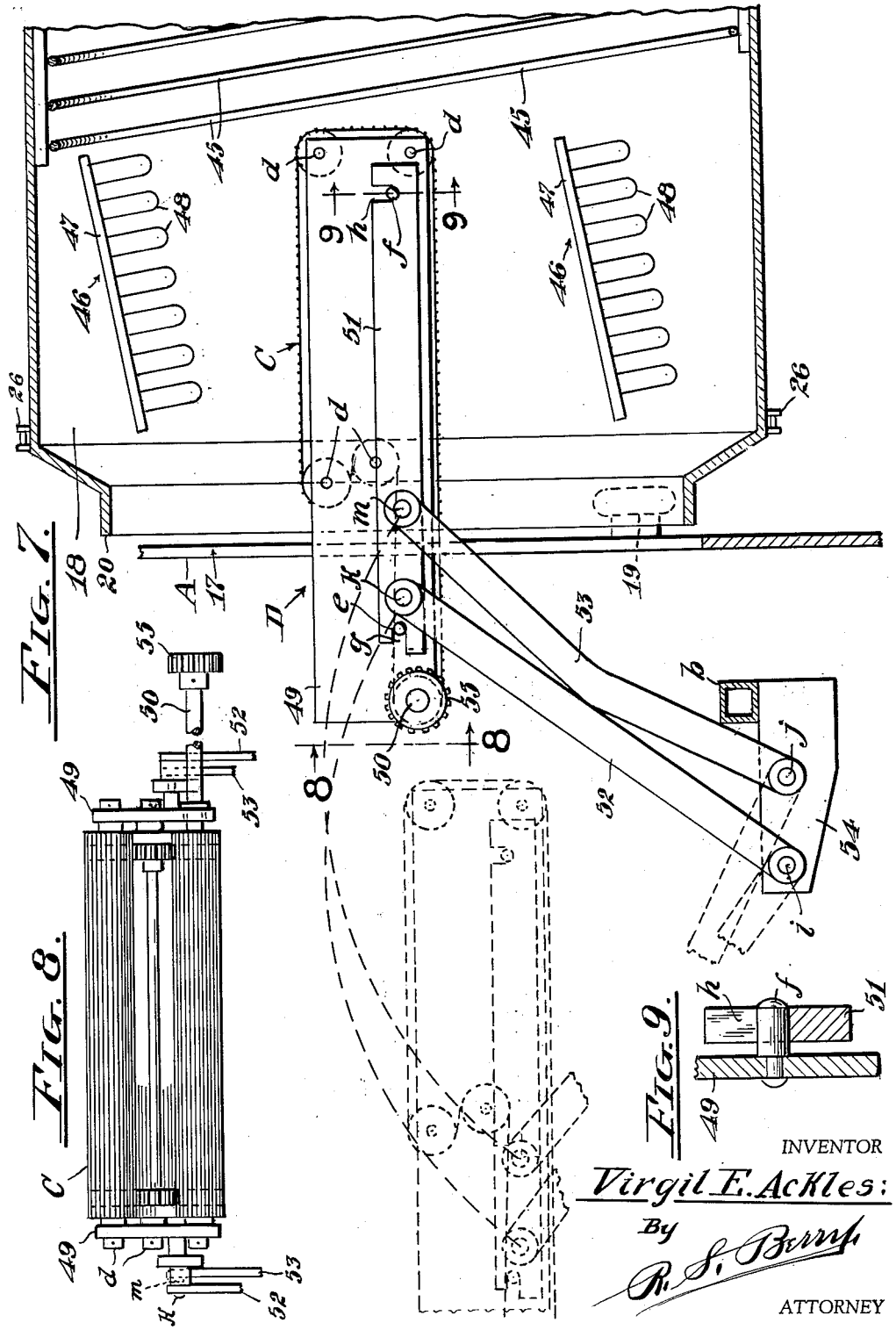
INVENTOR
*Virgil E. Ackles:*
By
ATTORNEY Aug. 27, 1963  V. E. ACKLES  3,102,052
TUMBLING MACHINE
Filed March 10, 1961  5 Sheets-Sheet 5
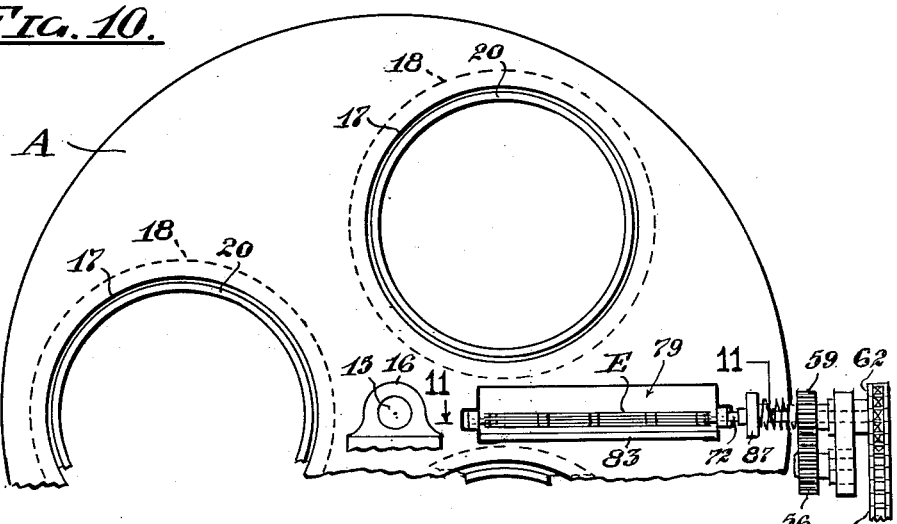
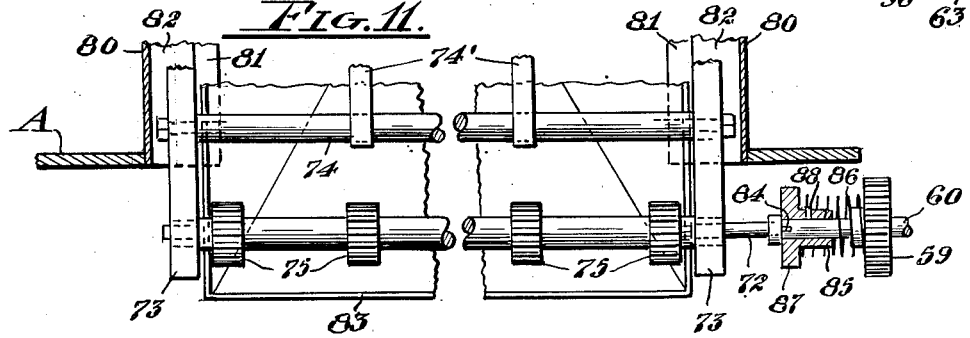
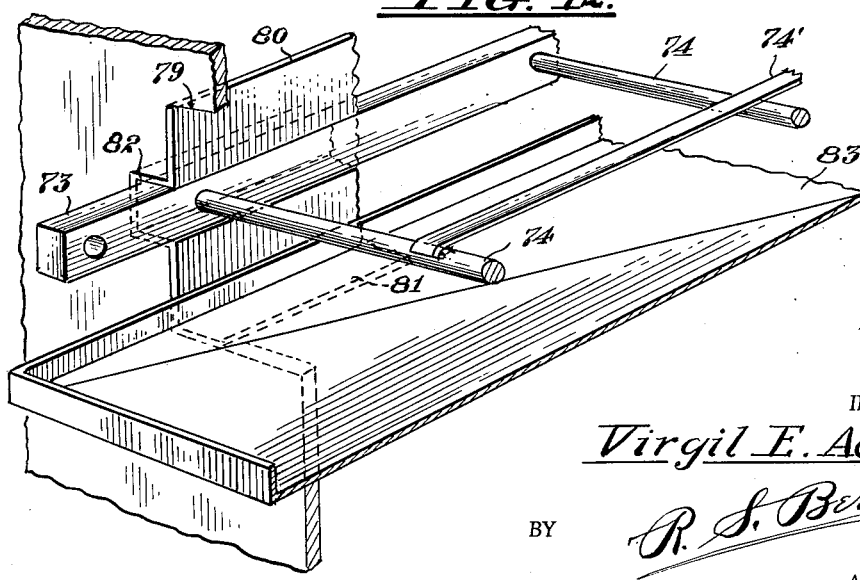
INVENTOR
*Virgil E. Ackles;*
BY *R. S. Berry*
ATTORNEY United States Patent Office 3,102,052
Patented Aug. 27, 1963

3,102,052
TUMBLING MACHINE
Virgil E. Ackles, 841 E. 4th St., Los Angeles, Calif.
Filed Mar. 10, 1961, Ser. No. 94,843
10 Claims. (Cl. 118—19)

This invention relates to a machine for applying crumbs and other edible granular or powdered substances to the surfaces of doughnuts and other similar products.

The primary object of the invention is to provide a machine of the above character to which doughnuts or the like may be continuously delivered and then be advanced continuously to discharge during application of granular substances thereto, whereby the machine is subject to being designed for large and rapid output and thus adapted for use in conjunction with the conveyor systems employed in wholesale production of doughnuts and the like when it is desired to coat the product with crumbs or other granular substances.

Another object is to provide a construction in the machine whereby it is adapted to be readily selectively conditioned for the application of a variety of granular substances.

Another object is to provide a crumbing machine which is positionable in line with the discharge end of a conveyor, wherein a plurality of crumb applying horizontal tumbling open ended drums are mounted for movement selectively with the intake end thereof in alignment with the conveyor end and wherein a supplement discharge conveyor is provided for positioning in the discharge end of the drum aligned with the conveyor end.

Another object is to provide a machine of the above recited nature having a by-pass conveyor whereby the products may be delivered through the machine apart from the crumb applying tumbler drums.

Another object is to provide powered driving mechanism embodying transmission mechanism adapted to be placed in and out of operative impelling engagement with either of the tumbler drums.

Another object is to provide gearing in the powered driving mechanism which is so constructed and arranged so be operable to effect propelling engagement with either the aforesaid product discharging conveyor or the stated by-pass conveyor.

With the foregoing objects in view together with such other objects and advantages as may subsequently appear, the invention resides in the parts and in the combination, construction and arrangement of parts hereinafter described and claimed, and as illustrated by way of example in the accompanying drawings in which:

FIG. 4 is a diagrammatic view in elevation of the powered driving mechanism of the machine;

FIG. 5 is a view in section and elevation taken on the line 5—5 of FIG. 4 as seen in the direction of the arrows;

FIG. 6 is an enlarged plan view taken on the line 6—6 of FIG. 4;

FIG. 7 is an enlarged view in vertical section and elevation as seen on the line 7—7 of FIG. 3 showing the construction and mode of operation of the discharge conveyor;

FIG. 8 is a formard end view of the discharge conveyor as seen on the line 8—8 of FIG. 7 in the direction indicated by the arrows;

FIG. 9 is a detail in section taken on the line 9—9 of FIG. 7;

FIG. 10 is a front view of a fragmentary portion of the machine showing the forward end of the by-pass conveyor and depicting the mode of operating same;

FIG. 11 is an enlarged horizontal section and plan view taken on line 11—11 of FIG. 10 with portions broken away; and FIG. 12 is an isometric view of a fragmentary portion of the front end mounting of the by-pass conveyor with the conveyor removed.

Figure 1:
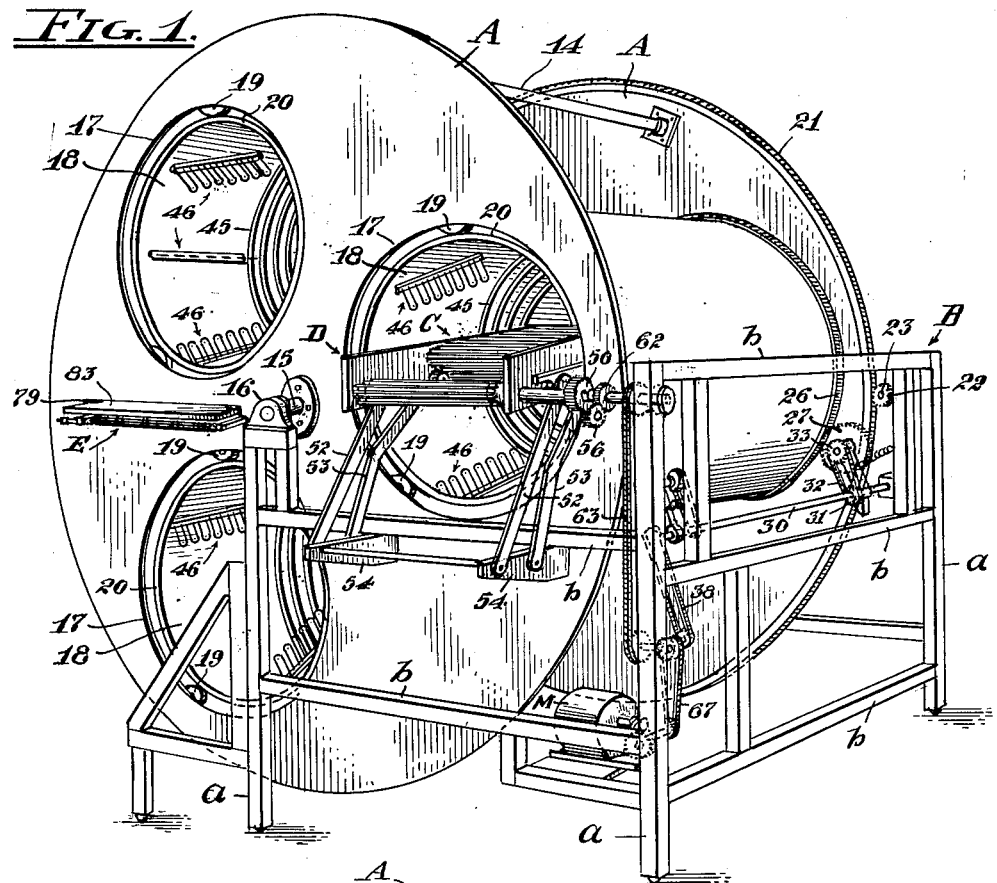
FIG. 1 is a perspective view of the machine as seen from the front and one side thereof.

Referring to the drawings more specifically A—A indicates a pair of horizontally spaced correspondingly dimensioned axially aligned vertically disposed circular end plates rigidly connected together by several parallel tie-rods 14 having their ends fastened to the inner sides of the end plates adjacent their peripheries. The plates A—A are pivotally mounted for circumferential turning on trunnions 15—15 projecting axially from the outer sides of the plates and journalled in bearings 16—16 carried on members of a supporting frame-work B which may be of any desired construction but is here shown as embodying a series of upright posts $a$ and a number of horizontal rails $b$ carried by the posts.

The end plates A—A each have a plurality of corresponding circular openings 17, here shown as three in number, which openings are spaced equi-distant apart around the centers of the plates with the openings in one of the plates directly opposed to the openings in the other plates, and with their axes correspondingly spaced radially from the centers of the plates.

Extending between each of the opposed openings 17 is a horizontally extending open ended cylindrical tumbler drum 18 the annular ends of which lie proximate to but spaced from the marginal portions of the plates A—A encircling the openings 17, the opening 17 thus being opposite and substantially co-extensive with the open ends of the drums.

Each of the drums 18 is revolubly supported at its ends on a series of rollers 19 mounted on the inner sides of the plates A—A; the drums having reduced end portions terminating in annular end rims 20 the external faces of which bear on the rollers 19.

Figure 2:
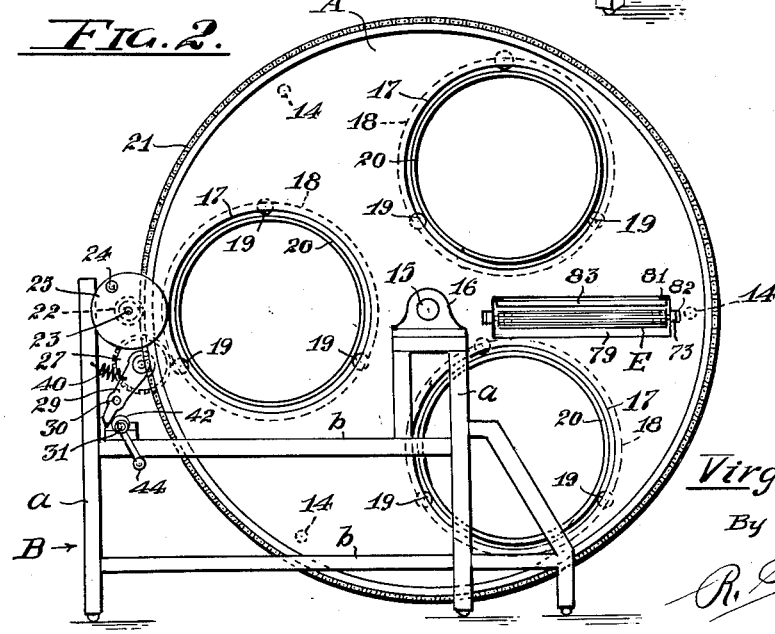
FIG. 2 is a rear elevational view of the machine.

The above recited assemblage is designed to be manually turned on the trunnions 15—15 to position either of the drums 18 and its associated openings 17 in the end plates A—A with the longitudinal axis of one of the drums extending on a horizontal plane leading axially through the trunnions 15—15 thus disposing the drum at one side of the trunnions as shown in FIGS. 1 and 2. When in such position hereinafter designated as a station, the rear end of the stationed drum is disposed to receive the discharge end of a conveyor not shown. As a means for facilitating turning of the assemblage the rear end plate A has a sprocket chain encircling its periphery and securely attached thereto, as by welding, so as to provide a gear-tooth engaging ring gear 21 around the margin of the end plate. A pinion 22 on a shaft 23 journalled in a bearing on the frame work B meshes with the sockets of the ring gear 21. A handle 24 on a disk 25 fixed on the outer end of the shaft 23 serves as a crank whereby the shaft 23 and pinion 22 may be manually rotated to turn the drum supporting assemblage.

Each of the drums 18 has a circumferentially extending ring gear 26 adjacent each end thereof which, when the drum is positioned at the station as above described, is disposed so that a driving toothed wheel 27 may be swung in or out of engagement therewith; a pair of toothed wheels 27—27 being fixed on revoluble shafts 28—28 carried on and extending horizontally through the outer ends of upwardly extending rocker arms 29—29 mounted on a horizontal shaft 30 to swing toward and away from the drum.

The shaft 30 has a pair of sprocket wheels 31—31 fixed thereon and engaging sprocket chains 32—32 which pass around and engage sprocket wheels 33—33 on the shafts 28 whereby rotation of the shaft 30 will effect rotation of the toothed wheels 27. As here shown, the shaft 30 is power driven from an electric motor M having a drive shaft 34 geared to a driven shaft 35 by intermeshed spiral and worm gears 36, the shaft 35 having a sprocket wheel 37 fixed thereon engaged by a chain 38 passing around and engaging a sprocket wheel 39 on the shaft 30 as shown in FIG. 4.

The rocker arms 29—29 are normally retracted by springs 40—40 to hold the toothed wheels out of engagement with the ring gear 26, and have lower end extensions 41—41 engaged by cams 42—42 on a rock-shaft 43 fitted with a handle 44 at an end thereof whereby the shaft 43 may be manually rocked to cause the cams 42 to swing the rocker arms 29—29 forwardly in opposition to the springs 40—40 and thereby cause the toothed wheels 27—27 to engage the ring gear 26, as shown in FIG. 5.

Each of the drums 18 is equipped on the interior thereof with a series of parallel spirally arranged rails 45 carried on the cylindrical wall of the drum, which rails lead from the intake end of the drum to a point spaced a short distance drum the discharge end of the drum. The spiral rails serve on rotation of the drum to advance doughnuts or the like deposited thereon toward the discharge end of the drum. Mounted on the drum in the space between the inner ends of the rails 45 and the discharge end of the drum is a series of fixed deflectors 46 arranged to gather the products delivered thereto by the rails 45 and as the drum revolves elevate the products and cause them to fall from the upper portion of the drum 18 onto a traveling conveyor C adapted to deliver the products to discharge from the drum.

The deflectors 46 each comprise a rib 47 on which is mounted a series of outwardly projecting U-shaped wire tines 48 arranged in a row with their side members laterally aligned; the rib 47 being positioned diagonally relative to the length of the drum and the tines 48 projecting inwardly of the drum as particularly shown in FIG. 7.

The conveyor C comprises an endless chain belt revolubly supported on a moveable frame D including a pair of spaced parallel horizontally extending side plates 49—49; a series of sprocket equipped parallel shafts being carried on the plates 49—49 on which the conveyor C is mounted including a driving shaft 50 and a plurality of idler shafts d arranged to support and propel the conveyor horizontally. The frame D is mounted for bodily swinging movement vertically for positioning an end portion of the conveyor C within the stationed drum 18 as indicated in full lines in FIG. 7 or to dispose the conveyor clear of the drum as indicated in dotted lines in FIG. 7. The mounting of the frame D embodies a pair of parallel bars 51—51 on which the plates 49—49 are removably supported by means of studs e and f projecting outwardly from the outer sides of the plates and seated in notches g and h in the end portions of the bars 51, which latter are carried on pairs of upstanding links 52—53 pivotally supported by pivots i—j on brackets 54 mounted on a rail b of the frame structure B. The upper ends of the links 52—53 are connected to the bars 51—51 by pivots k and m.

The frame D carrying the conveyor C is designed to be swung manually back and forth between its raised and lowered positions. Fixed on the outer end of the shaft 50 is a spur gear 55 which, when the frame D is in its uppermost and advanced position, intermeshes with an idler gear 56 mounted on a stud shaft 57 journalled in a bearing 58 the frame B as shown in FIG. 6 which idler gear meshes with a driving pinion 59 fixed on a shaft 60 supported in the extending through a bearing 61 on the frame B. A sprocket wheel 62 fixed on one end of the shaft 60 is engaged by a sprocket chain 63 which as shown in FIG. 4, passes around and is engaged by a sprocket wheel 64 on a shaft 65 driven by the motor M through a sprocket wheel 66 on the motor driven shaft 35, chain 67 engaging the sprocket wheel 66 and a sprocket wheel 68 on a shaft 69 geared by a pair of intermeshing beveled gears 70 to the shaft 65.

Manifestly when the conveyor frame D is in its lowered position, the gear 55 is out of mesh with the idler 56 which is driven with the shaft 60 when the motor M is in operation.

The shaft 60 projects outwardly from the pinion 59 and has a slot 71 on its outer end which is designed to be engaged when need be with the drive shaft 72 of a by-pass conveyor E with which the machine is equipped; the conveyor E being carried on the end plates A—A and extending therethrough intermediate adjacent of a pair of the drums 18.

Figure 3:
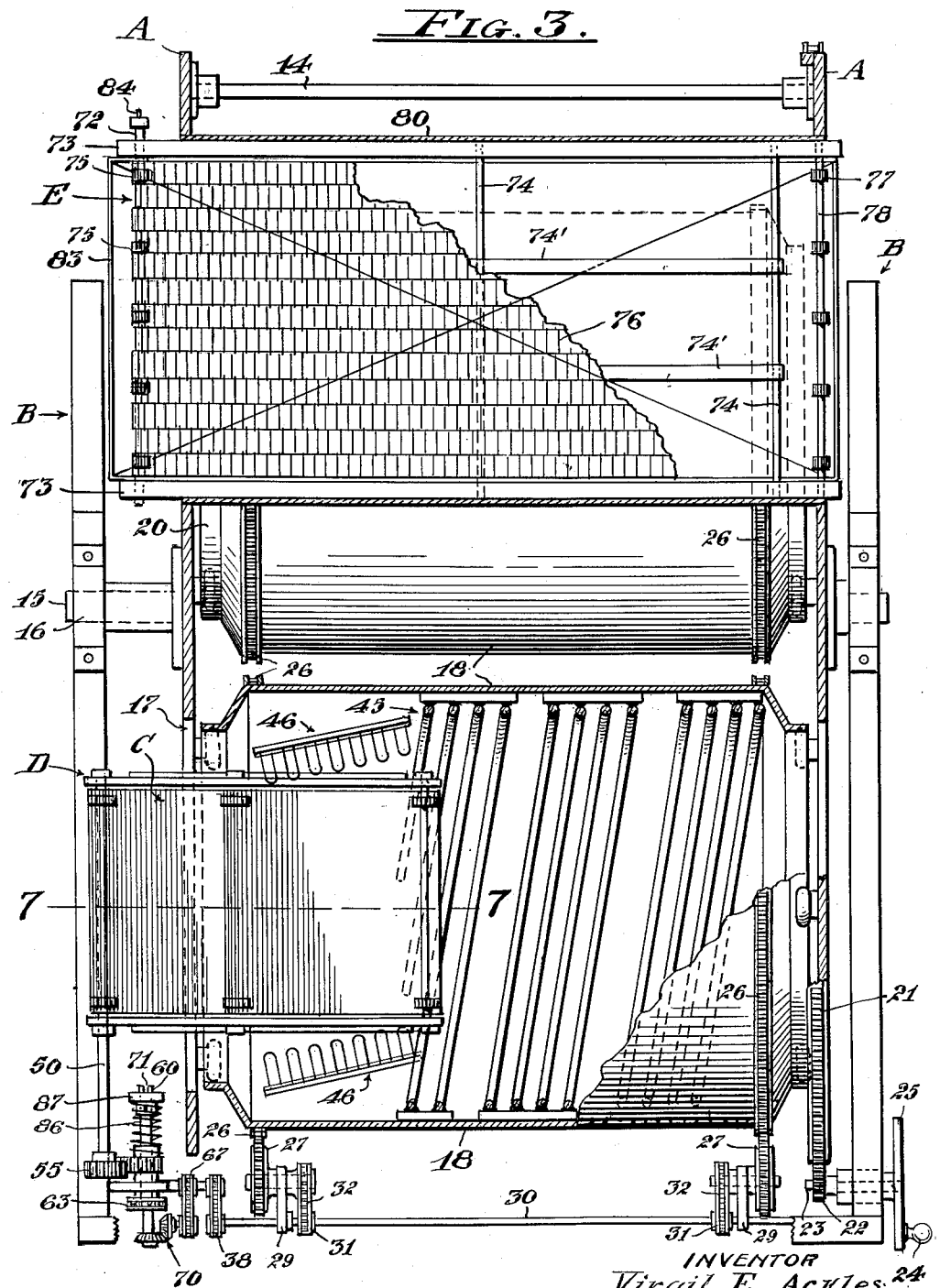
FIG. 3 is a view in horizontal section of the machine partly in plan with portions broken away.

The conveyor E embodies a pair of spaced parallel side rails 73—73 rigidly connected together at intervals intermediate their ends by cross bars 74. The shaft 72 extends between the rails 73—73 adjacent outer ends thereof and is revolubly supported thereby, the shaft being equipped with sprockets 75 engaging one end of a horizontally extending continuous chain conveyor 76 the other end of which passes around idler sprockets 77 on a shaft 78 carried on the opposite ends of the rails 73—73 as indicated in FIGS. 2 and 3.

As a means for supporting the upper run of the conveyor E against sagging a plurality of straps 74' are seated on and affixed to the cross-bars 74 as by welding; the straps 74' extending parallel to the side rails 73—73 and suitably spaced therefrom and from each other.

To accommodate the by-pass conveyor E the end plates A—A have opposed complementary elongated rectangular radially extending openings 79—79. Extending between the end plates A—A and seated in the openings 79—79 is a pair of guide plates 80—80 having inturned flanges 81—81 extending along their lower edges which seat on at their ends the lower margins of the openings 79—79. The guide plates seat against the end margins of the openings 79—79 and are affixed to the end plates A—A in suitable fashion, as by weld joints.

The guide plates 80—80 have longitudinal channels 82—82 intermediate the upper and lower edges thereof which channels slidably receive and conform to the side rails 73—73 and afford guideways in which the conveyor E may be mounted for removal and replacement by sliding the rails 73—73 lengthwise in and out of the channels.

Slidably carried on the flanges 81 of the guide plates 80—80 is a removable tray 83 which underlies the conveyor E co-extensive therewith, and which tray serves to catch particles dislodged from products carried on the conveyor and being transported thereby when the conveyor is in use.

As a means for effecting a connection between the drive shaft 72 of the conveyor E and the motor driven shaft 60, the guide channels 82—82 are arranged to dispose the side rails 73—73 so that the conveyor drive shaft 72 will extend in axial alignment with the shaft 60 when the end plates A—A of the machine are adjusted to place the conveyor E in the stationed position shown in FIG. 10. Connection between the then adjacent aligned shafts 72 and 60 is effected by means of an end tongue 84 on the shaft 72 extending into the slot 71 on the end of the shaft 60. As a means for securely holding the shafts 72 and 60 in their engaged aligned position, a flanged sleeve 85 is slidably mounted on the shaft 60 for longitudinal movement thereon under the urge of a thrust spring 86 bearing between an end flange 87 on the sleeve and the pinion 59. The sleeve 85 is held against rotation on the shaft 60 and limited in its outward movement thereon by a pin and slot connection 88 between the sleeve and shaft, as shown in FIG. 6. In effecting connection between the shafts 72 and 60, the sleeve 85 is initially retracted to clear the slot 71 and upon positioning the tongue 84 in the slot the sleeve is advanced under the urge of the spring 86 so as to overlie the tongue and slot connection and retain the parts in alignment.

In the application and operation of the invention the normally stationary support embodying the connected end plates A—A is adjusted circumferentially in either direction if need be, by rotating the hand crank 43 to thereby turn the ring gear 21 so as to advance the end plate A engaged thereby, as before described, and thereby dispose a selected drum 18 in its stationed position. A quantity of loose granular edible material such as crumbs, powdered sugar, spices and the like is placed in the stationed drum.

The machine is disposed with the intake end of the stationed drum 18 presented to the discharge end of a conveyor (not shown), the machine and the conveyor being relatively arranged so that doughnuts or other products being advanced on the conveyor will be discharged therefrom into the intake end of the contiguous drum.

On placing the motor M in operation to effect driving of the toothed wheels 27 and disposing the latter in engagement with the ring gear 26 on the stationed drum the latter will be rotated. Doughnuts or similar products delivered to the drum will be tumbled therein together with the granular content of the drum so as to effect coating of the product with the granules which will adhere thereto. The spiral rails 45 within the rotating drum will act to advance the coated products longitudinally of the drum toward the discharge end thereof into the path of travel of the pronged deflectors 46 which will act to catch and elevate the products and drop them onto the conveyor C then disposed within the discharge end of the drum. The conveyor C then being driven as before described will eject the coated products conveyed thereon from the drum 18 and deliver them to discharge as onto another conveyor (not shown), leading away from the machine.

When it is desired to apply another variety of granular material to the product such material is placed in another of the drums 18 and the machine adjusted to dispose such other drum in the stationed position; the toothed wheels 27 then being swung to their retracted position and the conveyor C being swung to its lowered position to permit rotation of the end plates A—A to the desired adjusted position.

When it is desired to deliver a quantity of uncoated products and it being inconvenient or undesirable to move the machine out of the conveyor line, the machine is adjusted to place the by-pass conveyor E in the stationed position and the shaft 72 thereof connected to the motor driven shaft 60 as before described. On this connection being effected and the conveyor E set in operation, products delivered to the intake end of the conveyor E will be carried thereby and delivered to discharge at the other end thereof.

During the operation of the by-pass conveyor E the conveyor C and its supporting frame D are lowered on the links 52—53 to a position below the discharge end of the conveyor E so that products discharged from the latter may be delivered to any suitable receptacle (not shown), positioned between the conveyors E and C.

By employment of the above recited construction the purposes of the invention may be effectively carried out. It is manifest however that the machine is subject to modifications, and accordingly the invention is not limited to the exact construction herein shown and described but embodies such constructions and equivalents as come within the scope of the appended claims.

I claim:

1. In a machine for applying granular edible substances to the surfaces of doughnuts and similar products, a plurality of open ended cylindrical drums, a normally stationary support for said drums adjustably turnable around a horizontal axis, said support having openings opposite the open ends of said drums and substantially co-extensive therewith, said drums being horizontally arranged on said support in parallel relation to each other around the axis thereof, said drums being individually mounted for circumferential rotary movement to effect tumbling of products delivered therein, means in each of said drums for advancing products therethrough longitudinally thereof, means for manually adjusting said support around the axis thereof to dispose a selected one of said drums at a determined station, power driven means engageable with a stationed drum to effect rotation thereof, and power propelled means for ejecting products from the stationed drum and conveying same to discharge when said turnable support is at rest.

2. The structure called for in claim 1 in which said support adjusting means comprises a circumferentially extending ring gear thereon, a pinion engaged with said ring gear, a shaft carrying said pinion and a hand crank on said shaft.

3. The structure called for in claim 1 in which said drums have circumferential ring gears thereon and wherein said power driven means embodies gear wheel mounted for swinging movement in and out of engagement with said ring gears, spring means normally holding said gear wheel out of engagement with said ring gears, manually operable means for swinging said gear wheel into engagement with said ring gears and maintaining such engagement in opposition to said spring means, and motor actuated means for driving said toothed wheel.

4. The structure called for in claim 1 in which said power propelled means comprises an endless conveyor, a support for said conveyor including a swinging mounting on which said conveyor may be positioned with an end portion thereof extending into or disposed clear of the stationed drum, and means for driving said conveyor.

5. The structure called for in claim 1 in which said power propelled means comprises an endless conveyor, a support for said conveyor including a swinging mounting on which said conveyor may be positioned with an end portion thereof extending into or disposed clear of the stationed drum, and means for driving said conveyor including a conveyor drive shaft, a spur gear thereon, and a power driven gear wheel mounted apart from said support with which said spur gear is engageable only when said mounting is positioned with said conveyor having an end portion extending into said drum.

6. In a machine for applying granular edible substances to the surfaces of doughnuts and similar products, a plurality of open ended cylindrical drums, a normally stationary support for said drums embodying end plates having opposed circular openings to which the open ends of said drums are presented and having an axis around which the support is turnable, means revolubly supporting the ends of said drums on said end plates, a framework on which said support is turnably mounted around its axis, said drums extending in parallel relation to each other around the axis of said support, means for manually turning said support around its axis to selectively dispose either of said drums at a determined station, power driven means releasably engageable with the drum located at the station for rotating the drum to tumble products therein in the presence of a granular substance to be adhered thereto, a spiral track in each of said drums for advancing the products therein toward an open end thereof constituting a discharge end, an endless conveyor having a portion thereof bodily moveable in and out of the discharge end of the stationed drum, deflectors in said drums adjacent the discharge ends thereof for directing products advanced therein by said spiral track onto said conveyor when extended into the stationed drum, means mounted on said frame-work for vertically swinging said conveyor into or out of said drum when said support is at rest, powered means for driving said conveyor engageable therewith when in its uppermost position and disengageable therefrom when out of its uppermost position.

7. In a machine for applying granular substances to the surfaces of doughnuts and the like embodying a series of tumbler drums having open intake and discharge ends, a normally stationary support for said drum having upright ends and having a horizontal axis around which the support is turnable, means revolubly carrying said support for circumferential adjustment around its horizontal axis, means revolubly supporting said drums horizontally between said ends with their open ends presented thereto, said drums extending in spaced parallel relation to each other around the axis of said support, means for conveying products to be coated longitudinally through said drums, and means for rotating said drums; a by-pass conveyor carried by and leading through said support ends intermediate adjacent of said drums including a drive shaft, and means for detachably connecting said drive shaft to said drum rotating means.

8. In a machine for applying granular substances to the surfaces of doughnuts and the like embodying a series of tumbler drums having open intake and discharge ends, a normally stationary support for said drums having upright ends and having a horizontal axis having openings opposite the open ends of said drums and substantially co-extensive therewith, pivotal means carrying said support for turning adjustment around its horizontal axis, said drums extending in spaced parallel relation to each other around the axis of said support and revolubly mounted on the support ends, and powered means for rotating a selected one of said drums located at a station in which the selected drum is positioned by turning said support, means for conveying products to be coated longitudinally through said drums including an endless conveyor located at said station, and means at said station for driving said conveyor when said support is at rest; a by-pass conveyor carried by and leading through said support ends intermediate adjacent of said drums including a drive shaft, and means for detachably connecting said drive shaft to said conveyor driving means.

9. In a machine for applying granular substances to the surfaces of doughnuts and the like embodying a series of tumbler drums having open intake and discharge ends, a normally stationary support for said drums having upright ends and having a horizontal axis having openings opposite the open ends of said drums and substantially co-extensive therewith, pivotal means carrying said support for turning adjustment around its axis, said drums extending in spaced parallel relation to each other around the axis of said support and revolubly mounted on the support ends, and powered means for rotating a selected one of said drums located at a station in which the selected drum is positioned by turning said support, means for conveying products to be coated longitudinally through said drums including an endless conveyor located at said station, a vertically swinging mounting for said conveyor whereby the conveyor may be moved to and from an elevated position into or out of one of said drums when said support is at rest, a drive shaft for said conveyor carried by said mounting, a spur gear on said shaft, an idler gear apart from said support arranged to be engaged by said spur gear when said conveyor is in its elevated position only, and means for driving said idler gear from said drum rotating means.

10. In a machine for applying granular substances to the surfaces of doughnuts and the like embodying a series of tumbler drums having open intake and discharge ends, a normally stationary support for said drums having upright ends and having a horizontal axis having openings opposite the open ends of said drums and substantially co-extensive therewith, pivotal means carrying said support for turning adjustment around its axis, said drums extending in spaced parallel relation to each other around the axis of said support and revolubly mounted on the support ends, and powered means for rotating a selected one of said drums located at a station in which the selected drum is positioned by turning said support, said drum rotating means embodying a circumferential ring gear on each of said drums, a toothed wheel engageable with the ring gear on a stationed drum, a vertically swinging arm carrying said toothed wheel, manually actuated cam means for moving said arm to dispose said toothed wheel into engagement with said ring gear, a motor driven shaft, a sprocket gear and chain driving connected between said shaft and toothed wheel, and means for conveying products to be coated longitudinally through said drums.

References Cited in the file of this patent

UNITED STATES PATENTS

| | | |
|---|---|---|
| 1,794,041 | Stone | Feb. 24, 1931 |
| 1,876,224 | Harding | Sept. 6, 1932 |
| 1,908,539 | Quick | May 9, 1933 |
| 2,370,955 | Guthrie | Mar. 6, 1945 |
| 2,698,799 | Rupp et al. | Jan. 4, 1955 |

FOREIGN PATENTS

| | | |
|---|---|---|
| 263,638 | Switzerland | Sept. 15, 1949 |